(12) United States Patent
Hammer et al.

(10) Patent No.: US 12,712,190 B2
(45) Date of Patent: Aug. 18, 2026

(54) FUEL-CELL EXHAUST ARRANGEMENT

(71) Applicant: Purem GmbH, Neunkirchen (DE)

(72) Inventors: Jochen Hammer, Stuttgart (DE); Markus Birgler, Wernau (DE); Patrick Schaller, Bopfingen (DE); Peter Wink, Goeppingen (DE); Andreas Wacker, Plochingen (DE)

(73) Assignee: Purem GmbH, Neunkirchen (DE)

( * ) Notice: Subject to any disclaimer, the term of this patent is extended or adjusted under 35 U.S.C. 154(b) by 643 days.

(21) Appl. No.: 18/320,515

(22) Filed: May 19, 2023

(65) Prior Publication Data

US 2023/0378501 A1 Nov. 23, 2023

(30) Foreign Application Priority Data

May 20, 2022 (DE) .................... 10 2022 112 681.1

(51) Int. Cl.
*B01D 53/02* (2006.01)
*H01M 8/04746* (2016.01)
*H01M 8/04828* (2016.01)

(52) U.S. Cl.
CPC ... *H01M 8/04761* (2013.01); *H01M 8/04843* (2013.01); *H01M 2250/20* (2013.01)

(58) Field of Classification Search
CPC ......... H01M 2250/20; H01M 8/04291; H01M 8/04761; H01M 8/04843; H01M 8/0662; Y02E 60/50
See application file for complete search history.

(56) References Cited

U.S. PATENT DOCUMENTS 2,808,896 A * 10/1957 Sigismond ................ F01N 1/10 181/256
4,513,841 A * 4/1985 Shimoji ............. F01N 13/1838 181/252

(Continued)

FOREIGN PATENT DOCUMENTS

DE 11 2006 000 693 B4 9/2011
DE 10 2016 221 566 A1 5/2018

(Continued)

OTHER PUBLICATIONS

Translation of DE 102016221556 A1 (Year: 2018).*

*Primary Examiner* — Christopher P Jones
(74) *Attorney, Agent, or Firm* — Walter Ottesen, P.A.

(57) ABSTRACT

A fuel-cell exhaust arrangement for a fuel-cell system includes an exhaust line, through which exhaust gas can flow, and a muffler through which the exhaust gas can flow. The muffler includes a housing with an inlet region for exhaust gas and with an outlet region for exhaust gas. An upstream line section of the exhaust line adjoins the inlet region for exhaust gas. A downstream line section of the exhaust line adjoins the outlet region for exhaust gas. At least one muffler chamber is formed in the housing. A base of the housing separates at least one liquid-collecting chamber from at least one muffler chamber. At least one liquid-passage opening connecting at least one muffler chamber to at least one liquid-collecting chamber for exchanging liquid is provided in the base. At least one liquid-discharging opening for discharging liquid from the at least one liquid-collecting chamber is provided on the housing.

16 Claims, 6 Drawing Sheets

(56) References Cited

U.S. PATENT DOCUMENTS

| | | | | |
|---|---|---|---|---|
| 4,842,096 | A * | 6/1989 | Fujitsubo | F01N 1/24 181/254 |
| 6,579,637 | B1 | 6/2003 | Savage et al. | |
| 8,136,629 | B2 * | 3/2012 | Inoue | F01N 1/006 181/227 |
| 9,523,304 | B2 * | 12/2016 | Furuya | F01N 13/007 |
| 11,220,949 | B2 * | 1/2022 | Teramoto | F01N 13/1805 |
| 12,397,659 | B2 * | 8/2025 | Park | G10K 11/162 |
| 2004/0149515 | A1 * | 8/2004 | Toyoshima | F01N 1/089 181/258 |
| 2007/0048572 | A1 * | 3/2007 | Oglesby | H01M 8/2475 429/414 |
| 2008/0185218 | A1 | 8/2008 | Kondo et al. | |
| 2013/0175114 | A1 | 7/2013 | Heo et al. | |
| 2016/0197362 | A1 | 7/2016 | Bauer et al. | |
| 2018/0159159 | A1 * | 6/2018 | Jung | B62D 35/007 |
| 2021/0111421 | A1 | 4/2021 | Martuscelli et al. | |

FOREIGN PATENT DOCUMENTS

| | | | |
|---|---|---|---|
| DE | 10 2020 124 754 | A1 | 4/2021 |
| EP | 3 047 533 | A1 | 7/2016 |
| JP | 2002-8693 | A | 1/2002 |
| JP | 2005-171874 | A | 6/2005 |
| JP | 2006-120455 | A | 5/2006 |
| JP | 2007-265999 | A | 10/2007 |
| JP | 2009-151973 | A | 7/2009 |
| JP | 2009-289581 | A | 12/2009 |
| JP | 2021-106476 | A | 7/2021 |

* cited by examiner 10
28
31
16
12
2040
36
14
70
38
82
30
24

28
31
16
12
10
40
70
36
14
20
38
82
30
24

FUEL-CELL EXHAUST ARRANGEMENT

CROSS REFERENCE TO RELATED APPLICATIONS

This application claims priority of German patent application no. 10 2022 112 681.1, filed May 20, 2022, the entire content of which is incorporated herein by reference.

TECHNICAL FIELD

The present disclosure relates to a fuel-cell exhaust arrangement via which the process gas emitted from a fuel cell can be emitted to the environment as fuel-cell exhaust gas.

BACKGROUND

In order to be able, particularly in vehicles driven by electric motor, to provide the energy for operating the electric traction motors and also for operating the other consumers of electrical energy in such vehicles, it is known to employ fuel cells. During the operation of such a fuel cell, hydrogen, or an anode gas greatly enriched with hydrogen, is supplied to an anode region. Oxygen, or air containing oxygen, is supplied to a cathode region as cathode gas. By conversion of hydrogen and oxygen into water, electric current is generated. The hydrogen-depleted anode exhaust gas and the cathode exhaust gas enriched with water leave the fuel cell as fuel-cell exhaust gas, or process gas. During fuel-cell operation, at least the cathode exhaust gas is emitted to the environment. In various operating phases—such as, for example, in the course of flushing, particularly of the anode region, prior to the start of fuel-cell operation—the anode exhaust gas, or the gas being conducted through the anode region in such an operating phase, can also be emitted to the environment.

It is an object of the disclosure is to provide a fuel-cell exhaust arrangement for a fuel-cell system, in particular in a vehicle, with which liquid—in particular, water—entrained in the fuel-cell exhaust gas can be extracted from the fuel-cell exhaust gas, with muffling of noises arising during fuel-cell operation.

In accordance with the disclosure, this object is, for example, achieved by a fuel-cell exhaust arrangement for a fuel-cell system, in particular in a vehicle, including a fuel-cell exhaust line, through which fuel-cell exhaust gas is capable of flowing, and a muffler unit, through which the fuel-cell exhaust gas is capable of flowing, wherein the muffler unit includes:

a muffler housing with an inlet region for fuel-cell exhaust gas and with an outlet region for fuel-cell exhaust gas, wherein an upstream line section of the fuel-cell exhaust line adjoins the inlet region for fuel-cell exhaust gas, and a downstream line section of the fuel-cell exhaust line adjoins the outlet region for fuel-cell exhaust gas, at least one muffler chamber formed in the muffler housing, at least one liquid-collecting chamber separated from at least one muffler chamber by a base of the muffler housing, wherein at least one liquid-passage opening connecting at least one muffler chamber to at least one liquid-collecting chamber for the exchange of liquid has been provided in the base of the housing, and wherein at least one liquid-discharging opening for discharging liquid from the at least one liquid-collecting chamber has been provided on the muffler housing.

The muffler unit employed in the fuel-cell exhaust arrangement constructed in accordance with the disclosure combines the function for muffling noises generated during the operation of a fuel-cell system, in particular by the various air condensers—such as compressors, for example—conveying the various streams of gas, with the extracting of liquid—in particular, water—contained in the fuel-cell exhaust gas. It is consequently guaranteed that, on the one hand, noises arising in the environment of a vehicle during the operation of a fuel-cell system are substantially not perceptible, or are perceptible only in greatly attenuated form, while at the same time the ejecting of a stream of fuel-cell exhaust gas greatly enriched with hot water, or water vapor, is prevented. The water withdrawn from the fuel-cell exhaust gas in the region of the muffler unit can be fed back as required into the working circuit of a fuel-cell system or can be emitted in liquid form to the environment.

For an efficient muffling of sound, a plurality of muffler chambers separated from one another in each instance by a partition may have been formed in the muffler housing. In this case, each muffler chamber may have been separated from the at least one liquid-collecting chamber by the base of the housing, so that liquid accumulating in each muffler chamber can be emitted therefrom.

For a uniform emission of liquid from all the muffler chambers, at least one liquid-passage opening may have been provided in the base of the housing, assigned to each muffler chamber.

In order to conduct the stream of fuel-cell exhaust gas in defined manner through the muffler housing, or through the muffler chambers formed therein, it is proposed that at least one fuel-cell exhaust pipe extending within at least one muffler chamber has been provided in the muffler housing, wherein at least one fuel-cell exhaust pipe is open to at least one muffler chamber via at least one opening, preferably via a plurality of openings, formed, for instance, in a pipe wall. There might also be provision, for instance, that at least one muffler chamber in conjunction with an opening formed in a fuel-cell exhaust pipe constitutes a resonator chamber of a Helmholtz resonator.

For a compact structure, nevertheless introducing a flow resistance that is as low as possible, there may be provision that the muffler housing is elongated in the direction of a longitudinal axis of the muffler housing, wherein the inlet region for fuel-cell exhaust gas has been formed in an upstream axial end region of the muffler housing, and the outlet region for fuel-cell exhaust gas has been formed in a downstream axial end region of the muffler housing. The fuel-cell exhaust gas is consequently able to flow through the muffler unit in substantially rectilinear manner without significant deflections of the flow.

In this case, the inlet region for fuel-cell exhaust gas may be open to an upstream muffler chamber, and the outlet region for fuel-cell exhaust gas may be open to a downstream muffler chamber, the upstream muffler chamber being separated from the downstream muffler chamber by at least one partition or/and at least one further muffler chamber.

In order to amplify the effect for the purpose of eliminating liquid from the fuel-cell exhaust gas, it is proposed that a liquid-eliminating chamber has been formed in the muffler housing, wherein the upstream line section of the fuel-cell exhaust line is open to the liquid-eliminating chamber, and the liquid-eliminating chamber is separated from a muffler chamber by a partition. The liquid-eliminating chamber may have been separated from the at least one liquid-collecting chamber by the base of the housing, wherein at least one liquid-passage opening connecting the liquid-eliminating chamber to at least one liquid-collecting chamber for the exchange of liquid has been provided in the base of the housing.

For the purpose of cutting liquid off from the fuel-cell exhaust gas in the region of the liquid-eliminating chamber, an eliminating-line section extending within the liquid-eliminating chamber with an upstream eliminating-line part in the inlet region for fuel-cell exhaust gas may adjoin the upstream line section of the fuel-cell exhaust line and may pass, with a downstream eliminating-line part, through the partition separating the liquid-eliminating chamber from a muffler chamber, or/and may be open to at least one muffler chamber. In the region of the downstream eliminating-line part adjacent to the upstream eliminating-line part, an opening region with a preferably substantially ring-like liquid-eliminating opening, open to the liquid-eliminating chamber, may have been formed.

In this opening region, an upstream end section of the downstream eliminating-line part may have been positioned in engaging manner in a downstream end section of the upstream eliminating-line part such that the liquid-eliminating opening has been formed between the upstream end section of the downstream eliminating-line part and the downstream end section of the upstream eliminating-line part. For this purpose, the downstream end section of the upstream eliminating-line part may, for instance, have been configured to be preferably widening in substantially conical manner in a main direction of flow of exhaust gas, or/and the upstream end section of the downstream eliminating-line part may have been configured to be preferably widening in substantially conical manner in the main direction of flow of exhaust gas.

In order to ensure, in this embodiment of the eliminating-line section, that a comparatively high concentration of liquid is accumulated in the radially outer region, with respect to a center axis of flow, of the stream of fuel-cell exhaust gas, and the radially outer part, enriched with liquid, of the stream of fuel-cell exhaust gas can then be discharged through the liquid-eliminating opening into the liquid-eliminating chamber, it is proposed that a swirl-flow-generating unit has been provided upstream of the liquid-eliminating opening. Such swirl-flow-generating units are employed, for instance, in exhaust arrangements of diesel internal-combustion engines in order to generate a turbulence in the stream of exhaust gas in a region upstream of an SCR catalytic-converter unit and consequently to generate an improved intermixing of exhaust gas with reducing agent injected into the exhaust gas.

Such a swirl-flow-generating unit may include a plurality of flow-deflecting elements succeeding one another in the circumferential direction with respect to a center axis of flow and pitched with respect to the main direction of flow of exhaust gas.

There may, for instance, further have been provided, assigned to the at least one liquid-collecting chamber:

- a liquid-emitting valve for optional clearing and occluding of the at least one liquid-discharging opening, or/and

- a liquid-level sensor for making information available about the level of liquid in the at least one liquid-collecting chamber, or/and

- a heating unit for warming up liquid accumulated in the at least one liquid-collecting chamber, or/and

- at least one hydrogen-emitting opening for emitting hydrogen from the at least one liquid-collecting chamber.

The use of a liquid-emitting valve makes it possible to discharge liquid, accumulated in the at least one liquid-collecting chamber when a sufficient quantity is present and when, for instance, during the operation of a fuel-cell system the feedback of liquid is required or advantageous, from the at least one liquid-collecting chamber and to feed it back into the working process. The information about whether sufficient liquid has been accumulated, or such a large quantity of liquid has already been accumulated that at least some thereof has to be discharged from the liquid-collecting chamber, can be made available by the liquid-level sensor. In order to guarantee that, even at comparatively low temperatures, the liquid accumulated in the at least one liquid-collecting chamber can be emitted, and frozen liquid is not blocking the emission, the heating unit—including, for instance, a heating coil or such like and consequently capable of being excited electrically—can be operated. Since, depending on the streams of process gas that are being conducted through the fuel-cell exhaust arrangement as fuel-cell exhaust gas, the fuel-cell exhaust gas may also contain hydrogen, for the purpose of avoiding the formation of a critical hydrogen concentration in the at least one liquid-collecting chamber the possibility is created of emitting hydrogen to the environment substantially continuously via the at least one hydrogen-emitting opening.

In the downstream line section of the fuel-cell exhaust line, a hydrogen sensor may have been provided for making information available about the hydrogen content in the fuel-cell exhaust gas. If it is detected that the concentration of hydrogen in the fuel-cell exhaust gas flowing through the downstream line section is too high, an increased air content, for instance, can be admixed to the fuel-cell exhaust gas, in order to lessen the hydrogen concentration. Furthermore, a gas-stream-regulating valve may have been arranged in the upstream line section. Such a gas-stream-regulating valve makes it possible to adjust the flow resistance in the fuel-cell exhaust arrangement in defined manner, so that the function of a pressure-holding valve for maintaining or adjusting the back-pressure required for the operation of a fuel-cell system can be fulfilled. Furthermore, such a gas-stream-regulating valve may also have been configured to introduce various streams of gas into the fuel-cell exhaust arrangement in defined manner, in order, for instance, to introduce the cathode exhaust gas or/and the anode exhaust gas of a fuel cell, or, if necessary, an additional air content required for lessening the hydrogen concentration, into the fuel-cell exhaust arrangement.

In order to assist the condensing of liquid contained in the fuel-cell exhaust gas, a condenser unit may have been arranged in the upstream line section of the fuel-cell exhaust line. In the condenser unit, the condensing of liquid contained in the fuel-cell exhaust gas can be triggered, for instance, by an exchange of heat between the ambient air, which is generally colder than the fuel-cell exhaust gas, and the fuel-cell exhaust gas. The use of a liquid as cooling medium is also possible. The heat taken up in the liquid can, for instance, be transferred in a heat-exchanger to the air to be introduced into a passenger compartment of a vehicle.

BRIEF DESCRIPTION OF DRAWINGS

The invention will now be described with reference to the drawings wherein.

DETAILED DESCRIPTION

Figure 1:
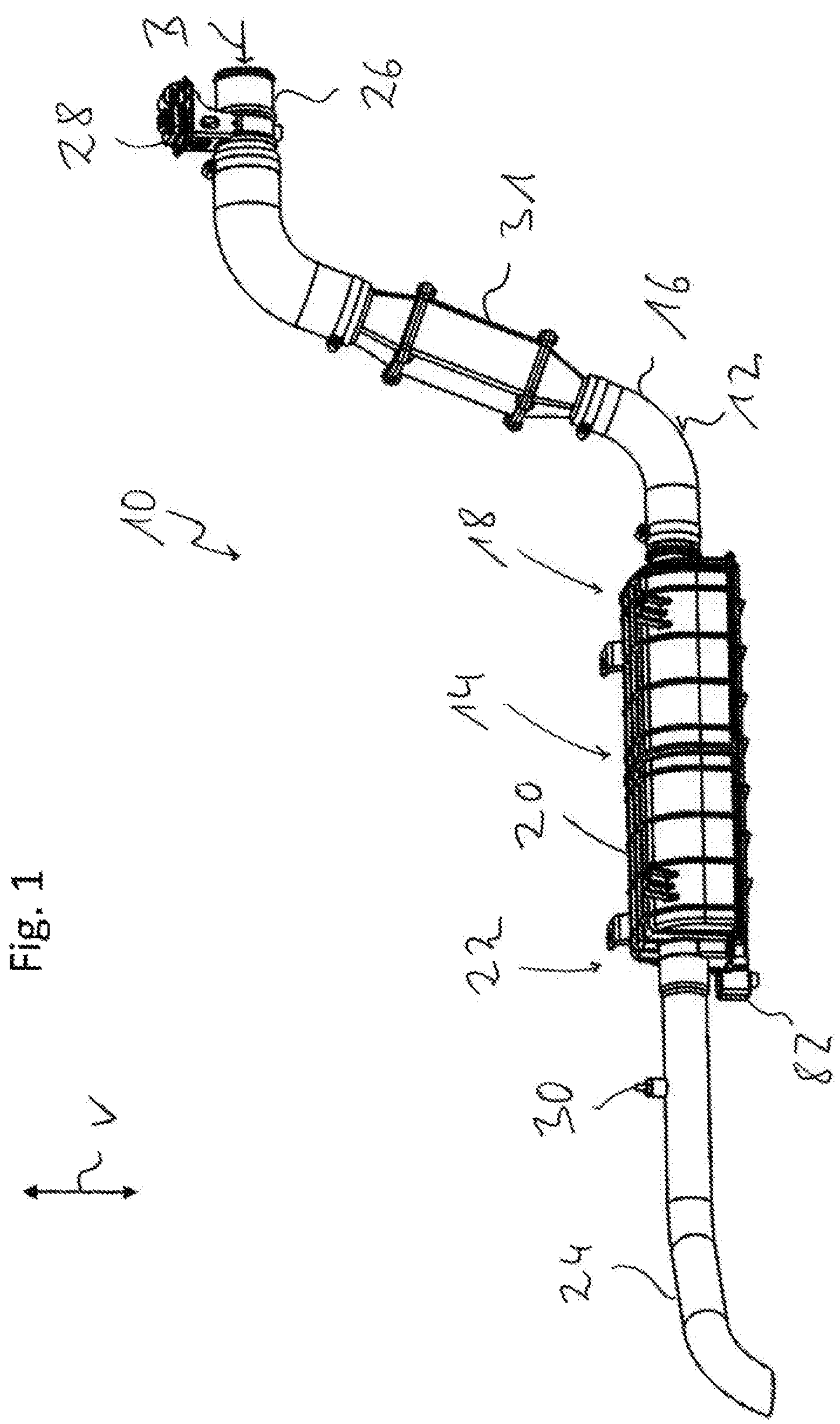
FIG. 1 shows a side view of a fuel-cell exhaust arrangement.
Figure 2:
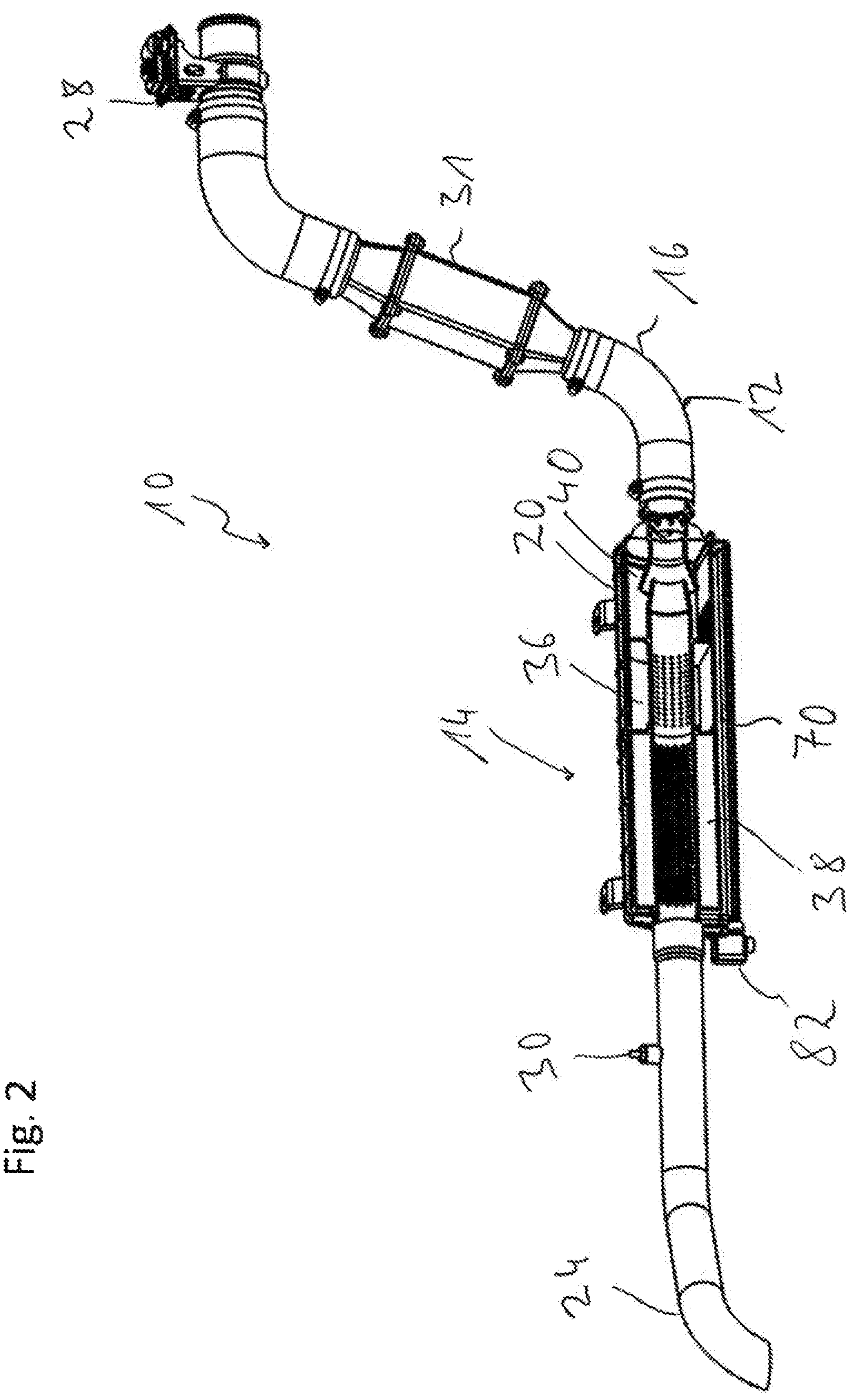
FIG. 2 shows the fuel-cell exhaust arrangement of FIG. 1 in perspective side view with muffler unit open.
Figure 3:
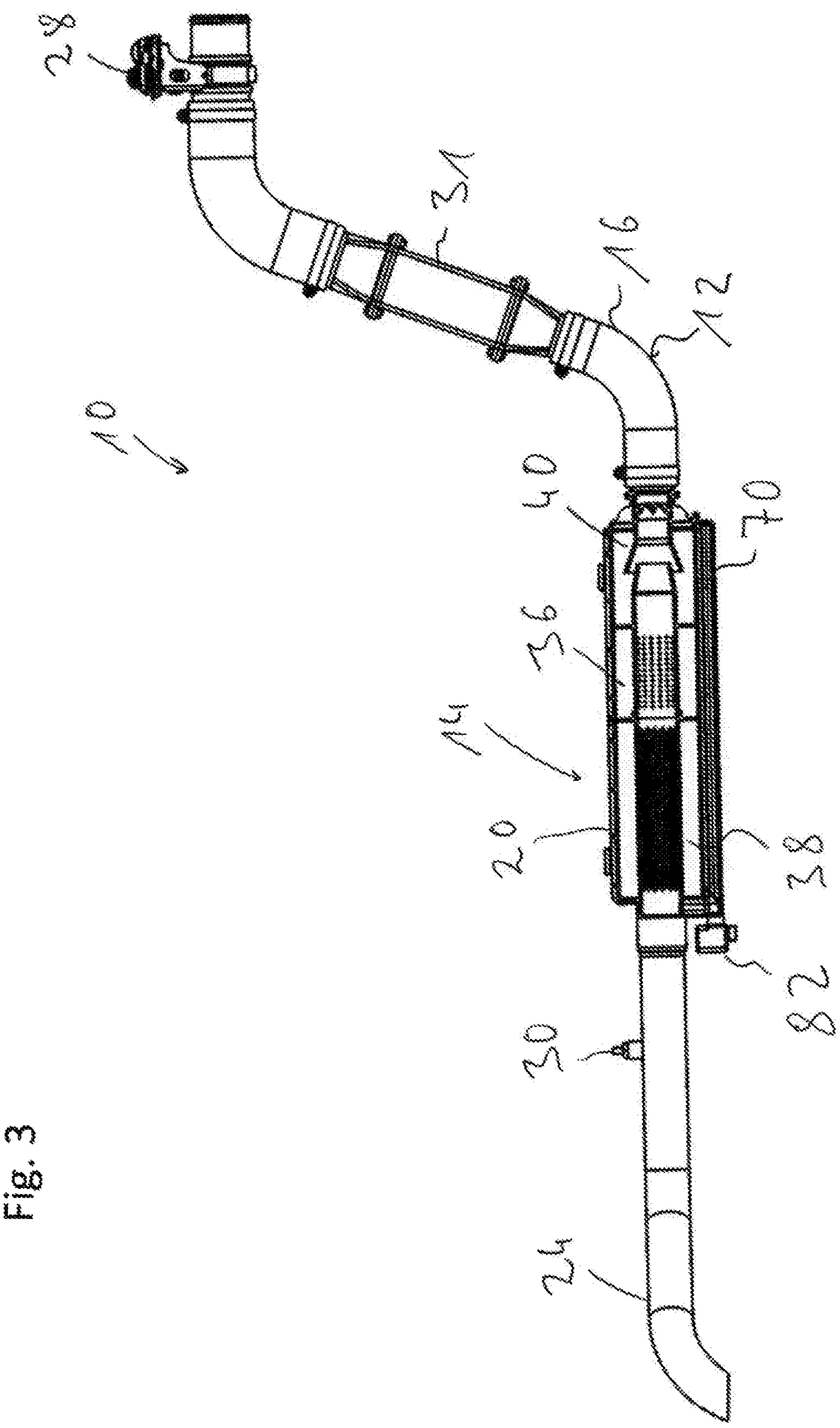
FIG. 3 shows a side view of the fuel-cell exhaust arrangement with muffler unit open.

FIGS. 1 to 3 show a fuel-cell exhaust arrangement 10 which may have been provided, assigned to a fuel-cell system employed in a vehicle for the purpose of generating electrical energy.

The fuel-cell exhaust arrangement 10 includes a fuel-cell exhaust line, denoted generally by 12, through which fuel-cell exhaust gas B is capable of flowing, and a muffler unit 14 integrated into the fuel-cell exhaust line 12. An upstream line section 16 of the fuel-cell exhaust line 12 adjoins the muffler unit 14 in an inlet region 18 for fuel-cell exhaust gas of a muffler housing 20. A downstream line section 24 of the fuel-cell exhaust line 12 adjoins the muffler unit 14 in an outlet region 22 for fuel-cell exhaust gas of the muffler housing 20. For instance, the fuel-cell exhaust gas B emitted by one or more fuel cells of a fuel-cell system can be emitted to the environment via the downstream line section 24 of the fuel-cell exhaust line 12. An upstream end region 26 of the upstream line section 16 of the fuel-cell exhaust line 12 may have been configured to be coupled to various system regions of one or more fuel cells, or fuel-cell stacks, emitting fuel-cell exhaust gas as process gas. For instance, the anode region or/and the cathode region of the fuel cell, or of each fuel cell, can be coupled to the upstream end region, in order to introduce the process gas leaving the anode region or/and the process gas leaving the cathode region into the fuel-cell exhaust arrangement 10 in a defined manner as fuel-cell exhaust gas B. Furthermore, ambient air can be introduced into the fuel-cell exhaust arrangement 10, for instance via a line region open to the environment.

For the purpose of adjusting the back-pressure generated in the fuel-cell exhaust arrangement 10, or for adjusting the streams of gas introduced into the arrangement, a gas-stream-regulating valve 28 may have been arranged, for instance, near the upstream end region 26 of the upstream line section 16 of the fuel-cell exhaust line 12. In the downstream line section 24, a hydrogen sensor 30 may have been provided, in order to make information available about the hydrogen concentration of the stream of fuel-cell exhaust gas flowing through the downstream line section 24. This stream may, in particular, contain hydrogen when the anode region is flushed at the start, or prior to the start, of fuel-cell operation and the process gas discharged from the anode region is emitted to the environment via the fuel-cell exhaust arrangement 10. If the signal generated by the hydrogen sensor 30 indicates a hydrogen concentration that is too high, an air content, or an increased air content, can be admixed to the fuel-cell exhaust gas B being conducted through the fuel-cell exhaust arrangement 10, for instance by appropriate triggering of the gas-stream-regulating valve 28, via the line region mentioned previously, in order consequently to obtain a lower hydrogen concentration.

Upstream of the muffler unit 14, a condenser unit, denoted generally by 31, may have been provided which assists the condensing of liquid, generally water, being transported in the fuel-cell exhaust gas B. In the muffler unit 14, such condensed liquid can, as described in the following, be withdrawn from the fuel-cell exhaust gas B, collected, and fed back into the fuel-cell process.

Figure 4:
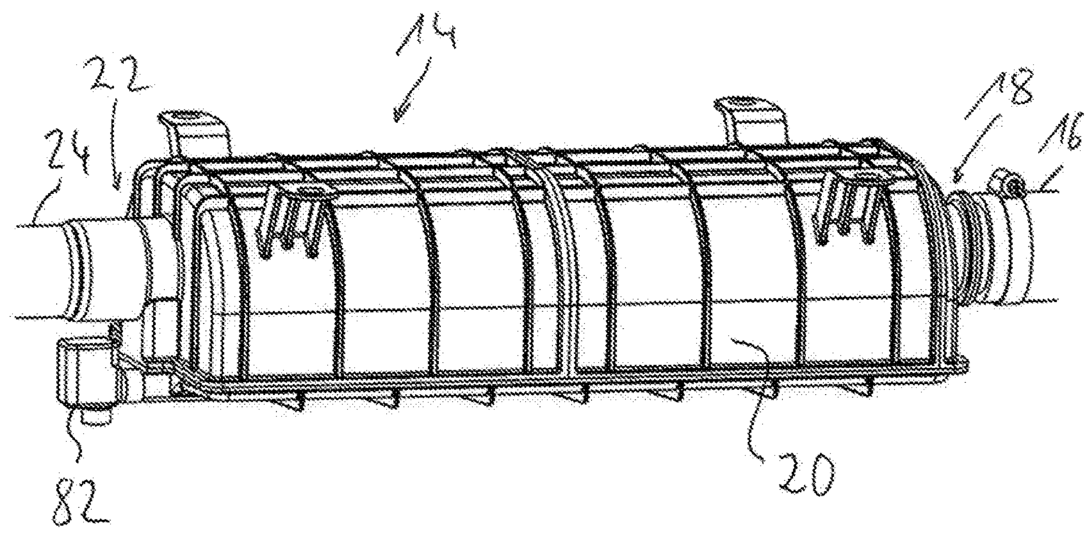
FIG. 4 shows a side view of the muffler unit of the fuel-cell exhaust arrangement of FIG. 1.
Figure 5:
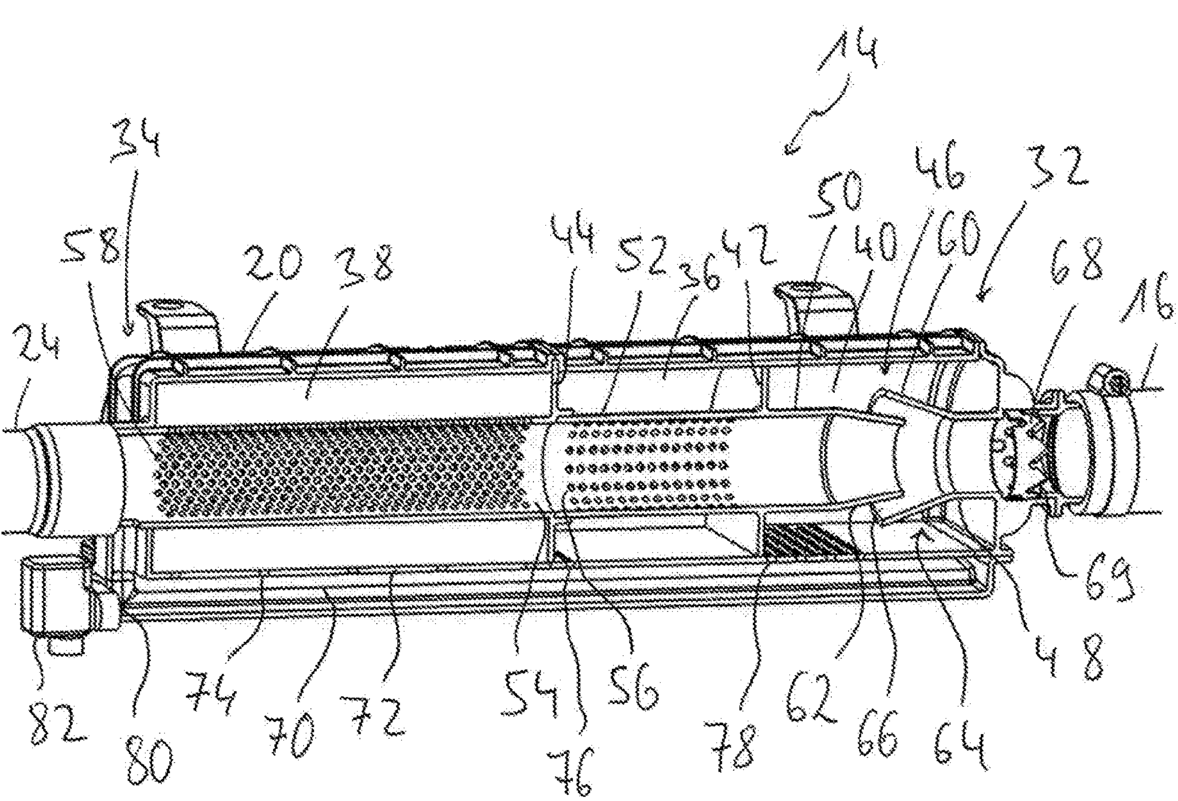
FIG. 5 shows a perspective side view of the muffler unit with muffler housing open.
Figure 6:
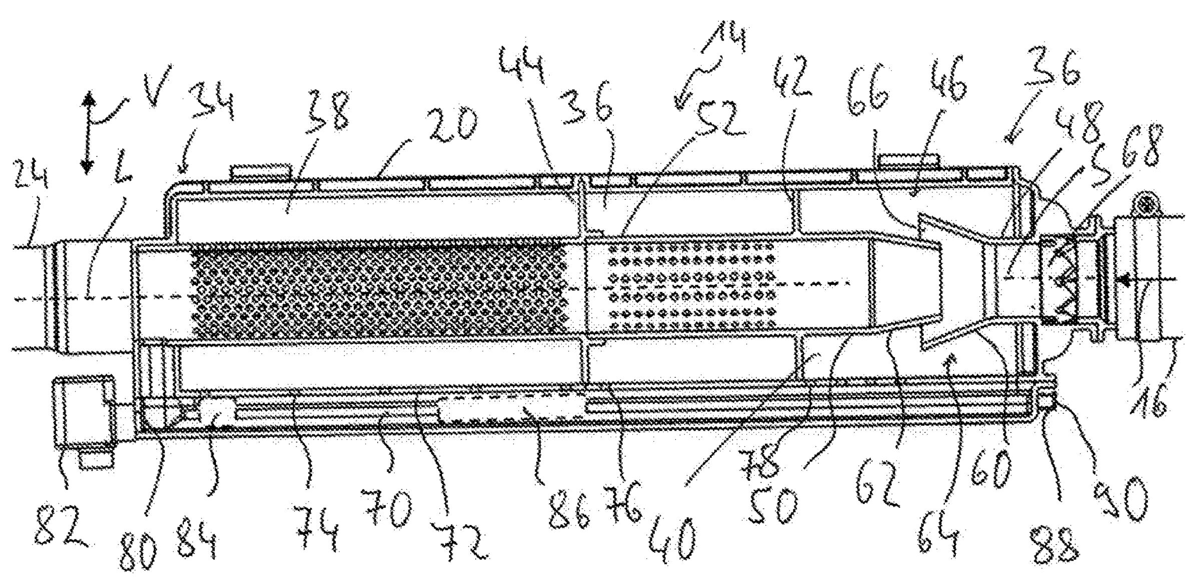
FIG. 6 shows a side view of the muffler unit with muffler housing open.

With reference to FIGS. 4 to 6, the structure and function of the muffler unit 14 will be elucidated in detailed manner in the following.

The muffler housing 20 is elongated in the direction of a longitudinal axis L of the muffler housing, and in an upstream end region 32 has been configured for the coupling of the upstream line section 16 of the fuel-cell exhaust line 12. In a downstream end region 34, the muffler housing 20 has been configured for the coupling of the downstream line section 24 of the fuel-cell exhaust line. For instance, the line sections 16, 24 can be linked, using pipe clamps or such like, to corresponding nozzles of the muffler housing 20.

In the interior of the muffler housing 20, two muffler chambers 36, 38 and also a liquid-eliminating chamber 40 have been formed. The upstream muffler chamber 36 is separated from the liquid-eliminating chamber 40 by a partition 42, and the downstream muffler chamber 38 is separated from the upstream muffler chamber 36 by a partition 44. The downstream line section 24 of the fuel-cell exhaust line 12 is open to the downstream muffler chamber 38. Via an eliminating-line section 46 arranged in the liquid-eliminating chamber 40, the upstream line section 16 of the fuel-cell exhaust line 12 is open to the two muffler chambers 36, 38.

The eliminating-line section 46 includes a tubular upstream eliminating-line part 48, adjoining the upstream line section 16 of the fuel-cell exhaust line 12 in the upstream end region 32 of the muffler housing 20, and also a downstream eliminating-line part 50 adjoining or passing through the partition 42. The downstream eliminating-line part 50 of the eliminating-line section 46 may adjoin a fuel-cell exhaust pipe 52 extending within the interior of the muffler housing 20 and formed in one piece or in multiple pieces, or may have been integrally formed with the exhaust line. Via a plurality of openings 56 formed in a pipe wall 54 of the fuel-cell exhaust pipe 52, the exhaust line is open to the upstream muffler chamber 36. Via a plurality of openings 58 formed in the pipe wall 54, the fuel-cell exhaust pipe 52 is open to the downstream muffler chamber 38. The fuel-cell exhaust pipe 52 extends through the partition 44 separating the two muffler chambers 36, 38 from one another, or may have been integrally formed, at least partially, with the partition, and adjoins the downstream line section 24 of the fuel-cell exhaust line 12 in the downstream end region 34 of the muffler housing 20.

It will be discerned in this structure that the fuel-cell exhaust gas B being conducted through the muffler unit 14 is able to flow through the muffler housing 20 in rectilinear manner along the longitudinal axis L of the muffler housing substantially without deflection of the flow, so no significant flow resistances are generated by the muffler unit 14. Nevertheless, by virtue of the communication with the various muffler chambers 36, 38 there is the possibility of muffling sound by reflection and absorption. For this purpose, sound-muffling material—such as porous fibrous or foamed material, for example—may, for instance, have additionally been arranged in one or both of the muffler chambers 36, 38. It should be pointed out that also more than two successive muffler chambers may have been provided, or that only a single such muffler chamber may have been provided in the interior of the muffler housing 20. Furthermore, at least one of the muffler chambers may act as resonator chamber of a Helmholtz resonator, and various of the muffler chambers may communicate with one another via additional fuel-cell exhaust pipes.

The upstream eliminating-line part exhibits a downstream end section 60 which has been configured to be, for instance, widening in substantially conical manner in the direction of a main direction of flow H of exhaust gas along a center axis S of flow. Similarly, the downstream eliminating-line part exhibits an upstream end section 62 which has been configured to be, for instance, widening in conical manner in the main direction of flow H of exhaust gas in this region, and has been positioned in engaging manner in the downstream end section 60 of the upstream eliminating-line part 48. Between the end sections 60, 62 widening radially in the main direction of flow H of exhaust gas along the center axis S of flow, a substantially ring-like liquid-eliminating opening 66 has been formed in an opening region 64 of the eliminating-line section 46.

Upstream of the opening region 64, a swirl-flow-generating unit 68 has been arranged, for instance, in the upstream eliminating-line part 48 integrally formed with a housing cover providing an upstream front wall of the muffler housing 20, or in the upstream line section 16 of the fuel-cell exhaust line 12. This unit may include a plurality of flow-deflecting elements 69 extending substantially radially and succeeding one another in the circumferential direction around the center axis S of flow and pitched with respect to the main direction of flow H of exhaust gas. A swirl flow is generated by the swirl-flow-generating unit 68 in the fuel-cell exhaust gas B being conducted in the main direction of flow H of exhaust gas. By reason of this swirl flow and the centrifugal forces arising therein, liquid components—for instance, water droplets or such like—being transported in the fuel-cell exhaust gas B are acted upon in a radially outward direction and accumulate with higher concentration in the radially outer region of the stream of fuel-cell exhaust gas. This radially outer part of the stream of fuel-cell exhaust gas can be discharged, at least partially, into the liquid-eliminating chamber 40 through the liquid-eliminating opening 66, so that liquid extracted from the stream of fuel-cell exhaust gas can accumulate in the liquid-eliminating chamber 40.

A liquid-collecting chamber 70 has been formed in a lower region of the muffler housing 20 in a vertical direction V in the case of a fuel-cell exhaust arrangement 10 mounted in a vehicle. This chamber preferably extends along the entire length of the muffler housing 20 from the upstream end region 32 to the downstream end region 34 of the housing and is separated from the two muffler chambers 36, 38 and also from the liquid-eliminating chamber 40 by a housing base 72. Assigned to each of these chambers, in each instance at least one liquid-passage opening 74, 76 and 78, respectively, has been formed in the housing base 72. Liquid accumulating in each of the muffler chambers 36, 38 and also in the liquid-eliminating chamber 40 can reach, through the assigned liquid-passage openings 74, 76, 78, the liquid-collecting chamber 70 and accumulate therein.

At least one liquid-discharging opening 80 with a liquid-emitting valve 82 has been provided, assigned to the liquid-collecting chamber 70. It will be discerned in FIGS. 1 to 6 that in the case of a fuel-cell exhaust arrangement installed in a vehicle the muffler housing 20 is inclined downward in the main direction of flow H of exhaust gas, so that the region of the liquid-collecting chamber 70 in which the liquid-discharging opening 80 has been positioned constitutes substantially the lowest region of the liquid-collecting chamber 70 in the vertical direction V. This means that liquid contained in the liquid-collecting chamber 70 accumulates, in principle, in the region of the liquid-discharging opening 80 or in the region of the liquid-emitting valve 82, so that, when the liquid-emitting valve 82 is open, liquid flows out of the liquid-collecting chamber 70 under the influence of gravity and can be fed back, for instance, into the fuel-cell process or can be emitted in liquid form to the environment.

A liquid-level sensor 84 represented schematically in FIG. 6 may have been provided, assigned to the liquid-collecting chamber 70, the output signal of which indicates the quantity of liquid that has accumulated in the liquid-collecting chamber 70. If this quantity is sufficiently large in order to be able to utilize the liquid—that is, water—during fuel-cell operation, the liquid-emitting valve 82 can be opened. Even when a threshold level has been exceeded and there is a risk that liquid can no longer flow away into the liquid-collecting chamber 70 at least from the lowest region of the downstream muffler chamber 38, the liquid-emitting valve 82 can be opened, in order to emit liquid from the liquid-collecting chamber 70.

Furthermore, a heating unit 86 represented schematically in FIG. 6 may have been assigned to the liquid-collecting chamber 70. As a result of electrical excitation, this unit can warm up the liquid accumulating in the liquid-collecting chamber 70, and can consequently prevent freezing of the liquid, or can already thaw out the frozen liquid. This guarantees that—at any time and, in particular, even at comparatively low ambient temperature—liquid can be emitted from the liquid-collecting chamber 70 and can be utilized again, for instance during fuel-cell operation.

Furthermore, at least one hydrogen-emitting opening 90, provided by a hydrogen-emitting nozzle 88, may have been provided, assigned to the liquid-collecting chamber 70. This hydrogen-emitting opening 90 may have been positioned in such a way that it is higher in the vertical direction V than the highest region of the liquid-collecting chamber 70. During fuel-cell operation, or in the course of the flushing of the anode region, hydrogen introduced into the fuel-cell exhaust arrangement 10 can, when this hydrogen reaches the liquid-collecting chamber 70 via the liquid-passage openings 74, 76, 78, consequently accumulate in the highest region of the liquid-collecting chamber 70, in which the liquid-collecting chamber 70 is open to the environment via the hydrogen-emitting opening 90. Consequently, hydrogen reaching the liquid-collecting chamber 70 can be emitted to the environment substantially permanently without there being a risk that a critical hydrogen concentration will be formed in the liquid-collecting chamber 70.

Figure 7:
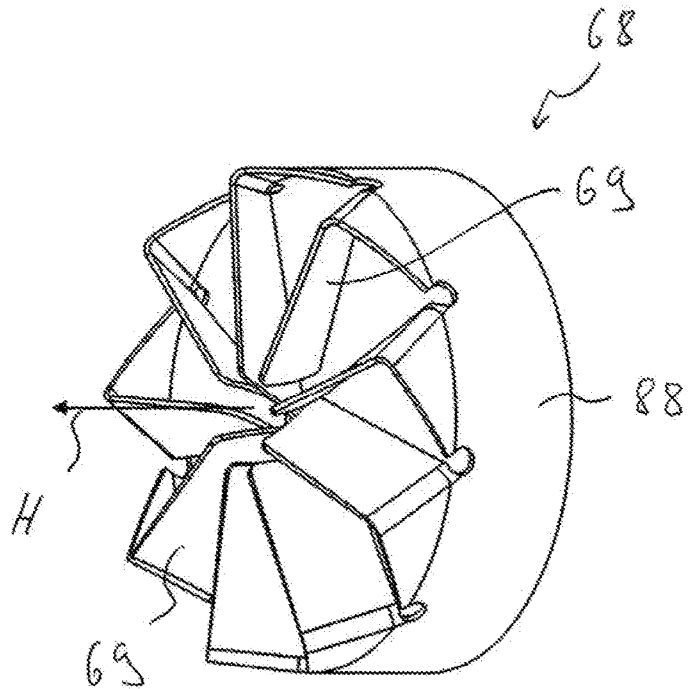
FIG. 7 shows a perspective view of a swirl-flow-generating unit.
Figure 8:
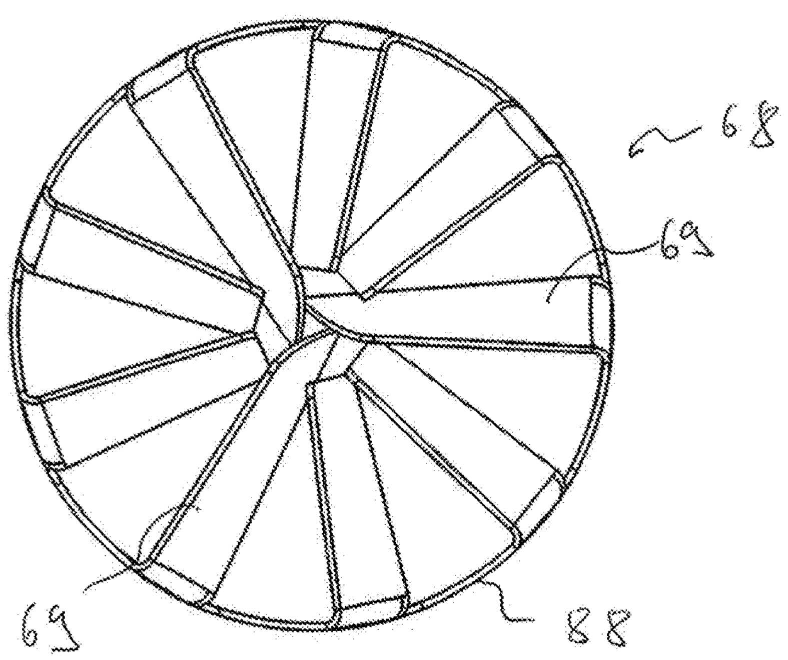
FIG. 8 shows the swirl-flow-generating unit of FIG. 7 in axial view; and, FIG. 9 shows a representation, corresponding to FIG. 8, of an alternative embodiment of the swirl-flow generating unit.
Figure 9:
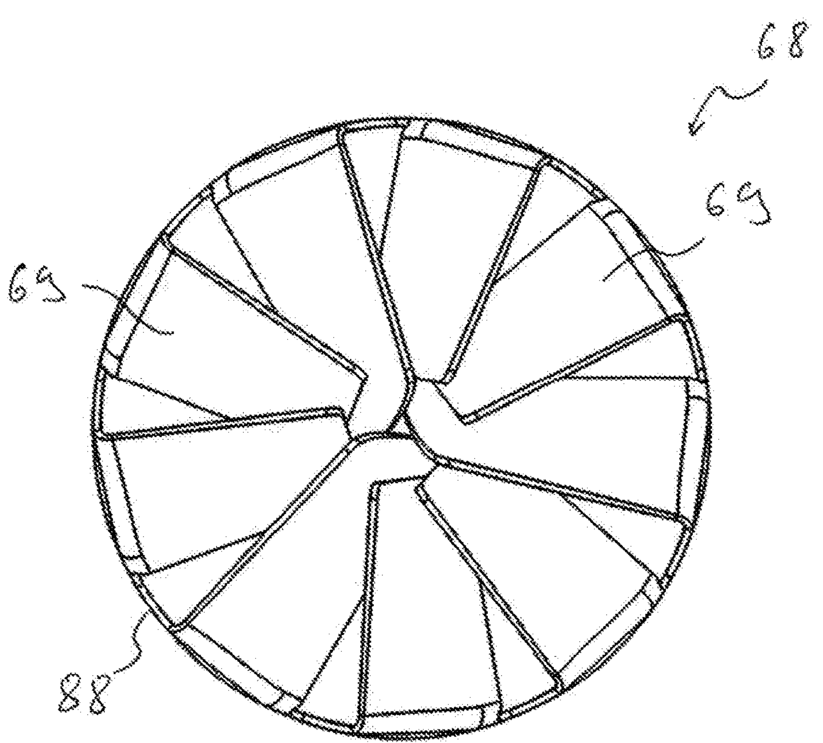

FIGS. 7 to 9 show, in more detailed manner, an example of an embodiment of the swirl-flow-generating unit 68 that is capable of being employed in the fuel-cell exhaust arrangement 10. This unit may, for instance, have been bent in one piece from a sheet-metal material and includes a ring-like or substantially cylindrical body 88 by which the swirl-flow-generating unit 68 may have been retained, for instance, on the upstream eliminating-line part 48. From the body 88, the flow-deflecting elements 69, formed in paddle-like manner and arranged succeeding one another in the circumferential direction, extend radially inward, so that they partially overlap in the circumferential direction, for instance with their radial inner end regions. The flow-deflecting elements 69 have been pitched with respect to the main direction of flow H of exhaust gas—that is, inclined at an angle different from 90°—so that the fuel-cell exhaust gas B which is to flow in the main direction of flow H of exhaust gas toward the swirl-flow-generating unit 68 is deflected on the flow-deflecting elements 69 in the circumferential direction with respect to the center axis S of flow, and a swirl flow is generated.

In an alternative embodiment, the swirl-flow-generating unit 68 may take the form of a plastic part. This results in a lightweight, corrosion-resistant structure that is inexpensive to manufacture, and enables, moreover, the construction of the swirl-flow-generating unit 68 with great configuration freedom.

It should be pointed out that other system regions or components of the fuel-cell exhaust arrangement 10—such as, for example, the fuel-cell exhaust line 12 and the muffler unit 14—may also have been constructed substantially entirely using plastic material. This contributes to a lightweight structure of the fuel-cell exhaust arrangement 10 that is inexpensive to manufacture and, in particular, corrosion-resistant with respect to the water contained in the fuel-cell exhaust gas B.

The extent of the deflection in the circumferential direction, and therefore the extent of the swirl flow generated, but, at the same time, also the extent of the stemming of the flow, generated by the flow-deflecting elements 69, depends on the angle of attack of the flow-deflecting elements 69 with respect to the main direction of flow H of exhaust gas. In the embodiment example represented in FIGS. 7 and 8, the flow-deflecting elements 69 have been angled to a comparatively small degree—that is, oriented more in the direction of the main direction of flow H of exhaust gas—so that a less intense deflection of the stream of fuel-cell exhaust gas in the circumferential direction is generated. FIG. 9 shows an embodiment of the swirl-flow-generating unit 68 in which the flow-deflecting elements 69, also further extended in the circumferential direction, have been pitched more intensely with respect to the main direction of flow of exhaust gas. With the structure of the swirl-flow-generating unit 68 represented in FIG. 9, the stream of fuel-cell exhaust gas is deflected more intensely in the circumferential direction, contributing to an increased centrifugal force acting on liquid particles contained in the fuel-cell exhaust gas.

The fuel-cell exhaust arrangement according to the disclosure combines advantageous or relevant functions for the operation thereof or, to be more exact, for the operation of a fuel-cell system in a vehicle. On the one hand, by virtue of the sound-muffling function of the muffler unit it is ensured that, for instance, noises on the path of flow of the fuel-cell exhaust gas, arising by virtue of the compressors conducting the process gas through the fuel cell, are reduced or almost completely eliminated. On the other hand, there is the possibility of extracting liquid—that is, in particular, water—entrained in the fuel-cell exhaust gas from the fuel-cell exhaust gas, so that it is not ejected into the environment but can be fed back as required into the working cycle of a fuel-cell system. Water eliminated from the fuel-cell exhaust gas that cannot be utilized in the fuel-cell process can be emitted in liquid form to the environment. The forming of a critical hydrogen concentration, particularly in the region of the muffler unit, is avoided by virtue of the permanently existing possibility of emitting hydrogen to the environment. The fact that the fuel-cell exhaust gas is able to flow through the muffler unit in substantially rectilinear manner also contributes, in particular, to this functionality. Intensely angled portions of pipe sections routing the fuel-cell exhaust gas, in particular in the interior of the muffler unit, and deflections of the flow introduced thereby, are avoided. Since water, or water vapor, and hydrogen can be discharged from the fuel-cell exhaust gas during the operation of a fuel-cell system and, if necessary, also fed back into the fuel-cell process, a loading of the environment of a vehicle with such substances is very largely avoided. Furthermore, it is to be emphasized that such a fuel-cell exhaust arrangement may also find application, for instance, in fuel-cell systems operated while stationary and also, for instance, in fuel-cell systems operated in ships or such like.

It is understood that the foregoing description is that of the preferred embodiments of the invention and that various changes and modifications may be made thereto without departing from the spirit and scope of the invention as defined in the appended claims.

The invention claimed is:

1. A fuel-cell exhaust arrangement for a fuel-cell system and the fuel-cell exhaust system in a vehicle, the fuel-cell exhaust arrangement comprising:
- a fuel-cell exhaust line for accommodating a flow of fuel-cell exhaust gas therethrough;
- a muffler for receiving and passing the flow of fuel-cell exhaust gas therethrough;
- said muffler including a muffler housing having an inlet region for the fuel-cell exhaust gas and an outlet region for the fuel-cell exhaust gas;
- said fuel-cell exhaust line having an upstream line section connected to said inlet region and a downstream line section connected to said outlet region;
- said muffler further including:
- at least one muffler chamber formed in said muffler housing;
- at least one liquid-collecting chamber;
- said muffler housing having a housing base separating said at least one liquid-collecting chamber from said at least one muffler chamber formed in said muffler housing;
- at least one fuel-cell exhaust pipe:
  - extending within at least one muffler chamber of said at least one muffler chamber formed in said muffler housing such as to be separated from said at least one liquid collecting chamber by said housing base; and
  - being open to at least one muffler chamber of said at least one muffler chamber formed in said muffler housing via at least one opening;
- at least one liquid-passage opening in said housing base connecting said at least one muffler chamber to which said at least one-fuel cell exhaust pipe is open via said at least one opening to said at least one liquid-collecting chamber for releasing liquid from said at least one muffler chamber to which said at least one-fuel cell exhaust pipe is open via said at least one opening to said at least one liquid-collecting chamber; and,
- at least one liquid-discharging opening provided on said muffler housing for discharging liquid from said at least one liquid-collecting chamber.

2. The fuel-cell exhaust arrangement of claim 1, further comprising:
- a plurality of said muffler chambers formed in said housing;
- a plurality of partitions separating corresponding ones of said plurality of said muffler chambers one from the other; and, each one of said muffler chambers being separated from said at least one liquid-collecting chamber by said housing base.

3. The fuel-cell exhaust arrangement of claim 2, further comprising a plurality of said liquid-passage openings being provided in said housing base assigned to said at least one muffler chamber to which said at least one-fuel cell exhaust pipe is open via said at least one opening.

4. The fuel-cell exhaust arrangement of claim 1, wherein said at least one fuel-cell exhaust pipe is open to said at least one of muffler chamber of said at least one of said muffler chamber formed in said muffler housing via a plurality of openings.

5. The fuel-cell exhaust arrangement of claim 1, wherein:

said muffler housing defines a longitudinal axis (L) and is configured to be elongated in the direction of said longitudinal axis (L);

said muffler housing has an upstream axial end region and a downstream axial end region; and, said inlet region for the fuel-cell exhaust gas is formed in said upstream axial end region of said muffler housing and said outlet region for the fuel-cell exhaust gas is formed in said downstream axial end region of said muffler housing.

6. The fuel-cell exhaust arrangement of claim 2, wherein a first one of said muffler chambers is an upstream muffler chamber and a second one of said muffler chambers is a downstream muffler chamber; said inlet region for the fuel-cell exhaust gas is open to said upstream muffler chamber and said outlet region for the fuel-cell exhaust gas is open to said downstream muffler chamber; and, said upstream muffler chamber is separated from said downstream muffler chamber by at least one of the following:

i) at least one of said partitions; and, ii) at least one of the other ones of said plurality of muffler chambers.

7. The fuel-cell exhaust arrangement of claim 1, further comprising:

a liquid-eliminating chamber formed in said muffler housing;

said upstream line section of said fuel-cell exhaust line being open to said liquid-eliminating chamber and said liquid-eliminating chamber being separated from one of said muffler chambers by a further partition;

said liquid-eliminating chamber being separated from said at least one liquid-collecting chamber by said housing base; and, at least one liquid-passage opening connecting said liquid-eliminating chamber to said at least one liquid-collecting chamber for the exchange of liquid being provided in said housing base.

8. The fuel-cell exhaust arrangement of claimed in claim 7, wherein an eliminating-line section extending within said liquid-eliminating chamber adjoins, with an upstream eliminating-line part in the inlet region for fuel-cell exhaust gas, the upstream line section of the fuel-cell exhaust line, and with a downstream eliminating-line part passes through said further partition separating the liquid-eliminating chamber from a muffler chamber, and/or is open to at least one of said muffler chambers, and wherein in the region of the downstream eliminating-line part adjacent to the upstream eliminating-line part, an opening region open to the liquid-eliminating chamber, is formed.

9. The fuel-cell exhaust arrangement of claim 8, wherein in the opening region, an upstream end section of the downstream eliminating-line part has been positioned in engaging manner in a downstream end section of the upstream eliminating-line part such that the liquid-eliminating opening has been formed between the upstream end section of the downstream eliminating-line part and the downstream end section of the upstream eliminating-line part.

10. The fuel-cell exhaust arrangement of claim 9, wherein the downstream end section of the upstream eliminating-line part has been configured to be widening in a conical manner in a main direction of flow (H) of exhaust gas, or/and wherein the upstream end section of the downstream eliminating-line part has been configured to be widened in a conical manner in the main direction of flow (H) of exhaust gas.

11. The fuel-cell exhaust arrangement of claim 8, wherein a swirl-flow-generating unit has been provided upstream of the liquid-eliminating opening.

12. The fuel-cell exhaust arrangement of claim 11, wherein the swirl-flow-generating unit comprises a plurality of flow-deflecting elements succeeding one another in the circumferential direction with respect to a center axis(S) of flow and pitched with respect to the main direction of flow of exhaust gas.

13. The fuel-cell exhaust arrangement of claim 1, wherein at least one of the following applies and assigned to said at least one liquid-collecting chamber:

(i) a liquid-emitting valve for optional clearing and occluding of the at least one liquid-discharging opening;

(ii) a liquid-level sensor for making information available about the level of liquid in the at least one liquid-collecting chamber;

(iii) a heating unit for warming up liquid accumulated in the at least one liquid-collecting chamber; and, (iv) at least one hydrogen-emitting opening for emitting hydrogen from the at least one liquid-collecting chamber.

14. The fuel-cell exhaust arrangement of claim 1, wherein a hydrogen sensor for making information available about the hydrogen content in the fuel-cell exhaust gas has been provided in the downstream line section of the fuel-cell exhaust line.

15. The fuel-cell exhaust arrangement of claim 1, wherein at least one of the following applies:

(i) a gas-stream-regulating valve has been arranged in the upstream line section; and, (ii) a condenser unit has been arranged in the upstream line section of the fuel-cell exhaust line.

16. The fuel-cell exhaust system of claim 8, wherein said opening has a ring-like liquid-eliminating opening opens to the liquid-eliminating chamber.

* * * * *